W. B. CONNELL.
TIRE.
APPLICATION FILED AUG. 28, 1908.
936,416.
Patented Oct. 12, 1909.
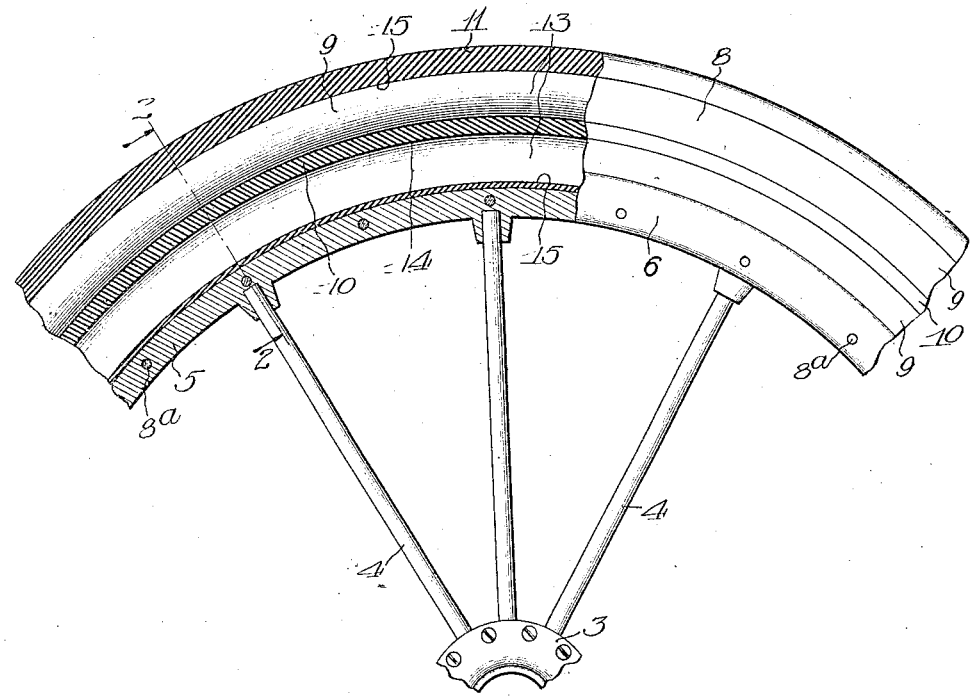
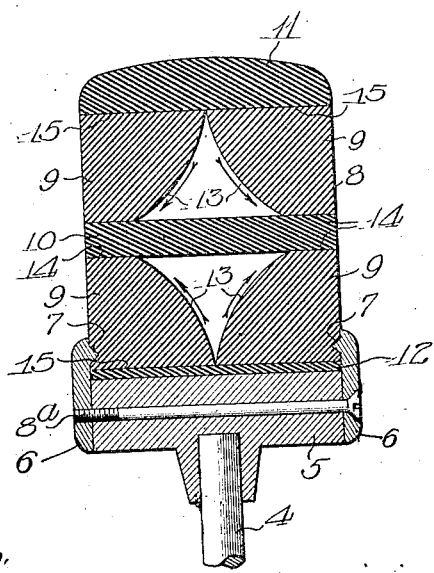
Witnesses
Inventor:
William B Connell
by Buckley Durand Drury
atty.

UNITED STATES PATENT OFFICE.

WILLIAM B. CONNELL, OF CHICAGO, ILLINOIS, ASSIGNOR OF ONE-THIRD TO JAMES J. McGRAW AND ONE-THIRD TO ARLIE A. SHIDEMAN, BOTH OF CHICAGO, ILLINOIS.

TIRE.

936,416.

Specification of Letters Patent. Patented Oct. 12, 1909.

Application filed August 28, 1908. Serial No. 450,655.

*To all whom it may concern:*

Be it known that I, WILLIAM B. CONNELL, a citizen of the United States of America, and resident of Chicago, Illinois, have invented a certain new and useful Improvement in Tires; of which the following is a specification.

My invention relates to improvements in tires, and is especially applicable to tires for use on automobiles, and has for its object the production of a tire in which the maximum of resiliency may be obtained at only a small proportion of expensive material.

A further object is the production of a device that will not quickly wear out and one that may be quickly put in place, as well as one that can be cheaply constructed.

These and such other objects as may hereinafter appear are attained by my device, an embodiment of which is illustrated in the accompanying drawings, in which—

Figure 1 represents a portion of a wheel with my improved tire in position, partly in section. Fig. 2 represents a sectional view on line 2—2 of Fig. 1, looking in the direction indicated by the arrows.

Like numerals of reference indicate like parts in the several figures of the drawings.

Referring now to the drawings—3 represents a hub, 4 the spokes, 5 the felly of an automobile wheel; 6—6 side rims having projections 7 adapted to grip into the tire 8. Screw-bolts 8$^a$ hold the rim securely in place on the felly. The tire proper comprises a body portion 9, a web 10, a tread 11 and a base 12. The body portion or section comprises four segments having inner curved faces 13, inner bearing faces 14, and outer faces 15, the outer bearing faces pressing against the tread and base and the inner faces against the web 10. The base 12 and body portions 9 may be made from a cheap grade of rubber, as they are only subjected to compression. The tread 11 may be made of rubber and fiber similar to hose, or in any other manner, or any material, so that it will have a good wearing surface. The central web, however, must be made of the very best quality of rubber, as it will be subjected to great tensile strain.

In assembling the parts of the tire, the body portions 9 are preferably cemented to the web, although other fastening means may be used, if desired.

In the use of my improved tire, the direct thrust upwardly from the ground and downwardly from the hub first tends to compress the portions 9, the pressure and thrust on the outer portions of the tire being directly transmitted to that portion of the web to which the portions 9 are cemented. The pressure and thrust from the center of the tire is, however, deflected, as indicated by the arrows in Fig. 2, and is transmitted to the same portion of the web, but at an acute angle, and the strains are resolved into direct pull or tension on the web 10. It will thus be seen that no matter what the strain, if within reasonable limits, the result is the same, and the pressure and thrust compressing the portions 9 stretches the web up to the point of the actual crushing of the tire. This conversion of the strains gives practically the same results as a pneumatic tire. The web being unconfined between the ends is free to vibrate, and to contract and expand, thus incidentally taking up all jolts or jars.

The fact that it is necessary to use the best rubber in only the web portion makes it possible to furnish a tire at a very reasonable cost, that will stand all the tests as well as the most expensive tires.

It is evident that this same form of construction may be used for cushion springs, or other devices in which it is desired to obtain resiliency.

I claim:

1. An automobile tire comprising a plurality of compression members, an expansion member, the compression members being located on opposite sides of said expansion member and provided with curved inner faces meeting in a straight line, providing substantially triangular channels with curved sides on either side of said expansion member.

2. An article of the class described comprising a central web and two pairs of compression members having oppositely disposed flattened sides resting on the ends of said web, the inner faces of said members being so positioned as to form a pair of substantially triangular channels one on either side of said web.

3. An article of the class described, comprising a central web and two pairs of compression members having oppositely disposed flattened sides resting on the ends of said web, the inner faces of said members being so positioned as to form a pair of substantially triangular channels one on either side of said web, and a wearing face secured to said members.

4. An article of the class described, comprising a central web, two pairs of flattened compression members located on each side of said web and resting thereon, the inner faces of said members being so disposed as to form a triangular channel on either side of said web, and a wearing member secured to said member, said compression members being so positioned that any compression is transmitted to the ends of said web or tension member, holding it between said members.

5. An automobile tire made up of a plurality of compression members and an expansion member, the compression members being located on opposite sides of the expansion member and provided with inwardly curved inner faces providing substantially triangular channels with curved sides on either side of said expansion member.

Signed by me at Chicago, Ill., this 18th day of August, 1908.

WILLIAM B. CONNELL.

Witnesses:
F. H. DRURY,
C. E. TAYLOR.